United States Patent
Kulkarni et al.

(10) Patent No.: US 7,662,877 B2
(45) Date of Patent: Feb. 16, 2010

(54) CRYSTALLINE THERMOPLASTIC POLYESTER RESIN COMPOSITION FOR CLEAR TRANSPARENT PRODUCTS AND PROCESS THEREOF

(75) Inventors: Sanjay Tammaji Kulkarni, Chennai (IN); Balasundaram Dilly Raj, Chennai (IN)

(73) Assignee: Futura Polyesters Ltd., Mumbai (IN)

( * ) Notice: Subject to any disclaimer, the term of this patent is extended or adjusted under 35 U.S.C. 154(b) by 363 days.

(21) Appl. No.: 11/485,753

(22) Filed: Jul. 13, 2006

(65) Prior Publication Data

US 2007/0167547 A1 Jul. 19, 2007

(30) Foreign Application Priority Data

Jul. 14, 2005 (IN) .......................... 938/CHE/2005

(51) Int. Cl.
*C08K 5/098* (2006.01)
*C08K 3/36* (2006.01)

(52) U.S. Cl. ...................... 524/284; 524/291; 524/445; 524/451; 524/605

(58) Field of Classification Search ................. 524/284, 524/291, 445, 451, 605
See application file for complete search history.

(56) References Cited

U.S. PATENT DOCUMENTS

2004/0028370 A1* 2/2004 Bourdelais et al. .......... 385/145
2004/0066556 A1* 4/2004 Dontula et al. .............. 359/599

* cited by examiner

*Primary Examiner*—Kriellion A Sanders
(74) *Attorney, Agent, or Firm*—Charles A. Muserlian

(57) ABSTRACT

A polyester resin composition comprising alkylene terephthalate, fast reheat (FRH) additives, nucleating additives, aliphatic dicarboxylic acid comonomers or their mixed composition to impart clarity and transparency to the CPET and a process for the preparation of said thermoplastic composition of clear CPET.

11 Claims, No Drawings

CRYSTALLINE THERMOPLASTIC POLYESTER RESIN COMPOSITION FOR CLEAR TRANSPARENT PRODUCTS AND PROCESS THEREOF

FIELD OF THE INVENTION

The present invention is directed to polymeric materials, more particularly, to thermoplastic polyester compositions, which are clear and transparent suitable for dual-ovenable trays and also for use in film and sheet applications.

BACKGROUND AND PRIOR ART REFERENCES

Definitions

In this specification the following terms will be used as follows:

Intrinsic Viscosity:—

It is a measure of a solute's contribution to the viscosity of a solution. It is defined as—

$$[n] = \lim_{\phi \to 0} \frac{n - no}{n0 \, \phi}$$

Where n0 is the viscosity in the absence of the solute and $\phi$ is the volume fraction of the solute in the solution. Intrinsic viscosity is a dimensionless number.

Comonomer:—

A monomer which is mixed with another monomer for a polymerization reaction the result of which is a copolymer.

(Copolymer is a polymer consisting two or more different monomers.)

Nucleating Agents:—

Chemical substances which when incorporated in plastics form nuclei for the growth of crystals in the polymer melt.

e.g.—In polypropylene a higher degree of crystallinity and more uniform crystalline structure is obtained by adding by a nucleating agent such as adipic and benzoic acid.

Mixing Extruder:—

In the extrusion process, polymer is propelled continuously along a screw through regions of high temp. and pressure where it is melted and compacted and finally forced through a die to give the final object. The device is called mixing extruder.

Melt Flow Index

The Melt Flow Index is a measure of the ease of flow of the melt of a thermoplastic polymer. It is defined as the weight of polymer in grams flowing in 10 minutes through a capillary of specific diameter and length by a pressure applied via prescribed alternative gravimetric weights for alternative prescribed temperatures.

The melt flow rate is an indirect measure of molecular weight, high melt flow rate corresponding to low molecular weight. At the same time, the melt flow rate is a measure of the ability of the material's melt to flow under pressure. The melt flow rate is inversely proportional to the viscosity of the melt at the conditions of the test, though it should be born in mind that the viscosity for any such material depends on the applied force. Ratios between two melt flow rate values for one material at different gravimetric weights is often used as a measure for the broadness of the molecular weight distribution.

Melt flow rate is very commonly used for polyolefins, polyethylene being measured at 190° C. and the polypropylene at 220 C. The plastics converter should choose a material with a melt index so high that he can easily form the polymer in the molten state into the article intended, but on the other hand so low that the mechanical strength of the final article will be sufficient for its use.

Synonyms of Melt Flow Index are Melt Flow Rate and Melt Index. Actually, more commonly used are their abbreviations MFI, MFR and MI. Be aware that, confusingly, MFR is also a term often used for the ratio between two melt flow rates at different gravimetric weights.

Melt Flow Index Unit:—

The apparatus used for MFI determination is essentially an extruder. The evaluation relates to melt flow behaviour of polyolefins under a specified condition. The test polymer may be used in any convenient form-power, granules or moulded pieces. The polymer sample is contained in a vertical metal cylinder subjected to controlled heating at 190 deg. And then extruded through a jet by a loaded piston. MFI is given by the amount of polymer in gram extruded in 2.5 min.

Polyesters are polymeric materials typically made by a condensation reaction of dibasic acids and dihydric alcohols. Common examples of polyesters include alkylene terephthalate and naphthalate polymers. Alkylene terephthalate such as Polyethylene terephthalate (PET) though has many advantages, its primary drawbacks are its low glass transition temperature Tg, the slow crystallization rates particularly its copolyester grades and relatively low impact strength. PET tends to become brittle upon crystallization, especially upon thermal crystallization, and is not dimensionally stable at temperatures above their Tg. As a consequence, non-oriented, thermally crystallized PET has poor ductility, poor impact resistance, and poor heat resistance, which limit its utility in many applications.

The wide spread usage of microwave ovens for household purpose has resulted in the development of food trays which can be used in either microwave ovens or the conventional convection ovens and these are commonly called as dual-ovenable trays. The basic requirements for such trays are: (i) they should be capable of withstanding rapid heating from freezer temperatures of about −40° C. to oven temperatures of about 200° C., (ii) capable of retaining good dimensional stability at both freezer and oven temperatures; and (iii) having good impact strength.

In general, the resin in accordance with this invention, hereinafter referred to as CPET resin is suitably modified with additives to achieve these requirements and invariably this is done by the sheet manufactures while extruding the resin. The extruded sheets are converted to trays by thermoforming wherein they are preheated to a temperature sufficient to allow deformation of the sheet. The preheated sheet is then made to conform to the contours of the mold by assistance with vacuum, air pressure or matched mold set. The trays are heat treated in the mold to increase the crystallinity. In addition to these, the modified CPET resin should have high temperature resistance i.e. thermally stable while processing at high temperatures without generating by-products of degradation. Hence, processing stabilizers or antioxidants are incorporated into the polymer to prevent degradation during processing.

Thus the additives for modification will comprise nucleating agents for increasing the crystallinity, process stabilizers like anti oxidants to improve the thermal stability; impact modifiers to enhance impact strength; and heating aids for faster preheating of the extruded sheets and additives to improve melt strength of polymer.

Nucleating agents are well known in the polyester art as materials which accelerate crystallization and which is necessary to obtain thermal dimensional stability. These nucleating agents may be inorganic or organic additives like talc, gypsum, silica, calcium carbonate, alumina, titanium dioxide, calcium silicate, finely divided metals, powdered glass, carbon black, mica, graphite, salts of monocarboxylic or polycarboxylic acids, chlorobenzoates, benzophenone, alkylsulfonates, dibenzylidene sorbitol compounds, alkyl aryl phosphates, cyclic bis-phenol phosphates, acetals of sorbitol and xylitiol, remnants of polycondensation catalysts, polymers comprising polyolefins, various copolymers of ethylene and styrene derivatives, ionomers, blends of faster crystallizing polymers like PBT, PBN, PA etc., individually or mixtures of one or more.

Polyesters are susceptible to auto oxidation with hydrogen abstraction from —CO—O—$CH_2$— link. In order to prevent this, anti oxidants are added and dosage is kept at minimum to maintain the polymers' original strength, flexibility and toughness and their properties need to be maintained to meet end use applications. Thermal stabilizers or Antioxidants are used as additives, which resist the reaction of peroxides, formed by atmospheric oxygen on polyester. Varieties of antioxidants are known and can be grouped as Primary— phenols, hindered phenols and arylamines; Secondary— phosphites and thiosynergists; and New—hydroxylamines and benzofuranones (lactones).

As mentioned earlier though PET has good mechanical and thermal properties with an excellent surface appearance, the material fails in a brittle manner at room temperature, limiting its applicability due to this poor impact strength. Improvement of the impact behaviour based on the dispersion of small rubber particles in a thermoplastic polymer matrix is a well known phenomenon.

The conventional CPET resin used as of now will give only opaque trays due to its high crystallinity and generally they are either colored black or opaque white. However they are normally provided with a lid, which is made of amorphous PET or APET, which is highly transparent, but not microwave ovenable and hence has to be removed prior to microwave heating. APET, an amorphous (non-crystalline) PET, is a disposable packaging material for refrigerated storage conditions. Because of its outstanding clarity, it is more suitable for cold-temperature applications and offers enhanced product visibility, allowing full inspection of the product before purchase, an attribute for which consumers pay a premium.

This way the present practice is to use the hitherto available opaque PET tray for the contents and cover it with the clear transparent tray made of APET. With the increasing concerns over food safety, consumers like to see exactly what they are buying.

There is very little information available on clear PET or highly crystalline transparent PET suitable for thermoforming applications. Though a variety of clarifying agents are known which show good results with polymers like polypropylene (PP), they do not show the same trend with polyesters like PET.

U.S. Pat. No. 5,405,921 is the only patent, to the knowledge of the applicant, which describes a polyester composition with improved optical properties and heat stability wherein the oriented, crystallizable polyester compositions can be thermoformed and heat set. Specialized alkali metal-containing nucleating agents were used to provide high crystallization rates.

However no details are available about its suitability for dual ovenable trays.

OBJECTS OF THE PRESENT INVENTION

The primary object of the present invention is to provide a thermoplastic polyester composition, which is clear and transparent suitable for dual-ovenable trays and also in PET film and sheet applications.

An object of the present invention is to provide a polyester resin composition comprising an alkylene terephthalate or naphthalate polyester, Fast Reheat (FRH) additives, Nucleating additives in the presence of comonomers like aliphatic dicarboxylic acids or their mixed composition to impart clarity and transparency to the CPET resin of this invention.

Another object of the present invention is to provide a process for the preparation of said thermoplastic composition of CPET.

DETAILED DESCRIPTION OF THE PRESENT INVENTION

The thermoplastic polyester resin composition of the present invention comprises an alkylene terephthalate, Fast Reheat (FRH) additives, Nucleating additives, and aliphatic dicarboxylic acids or their mixed composition as special combination additive comonomers which collectively and synergistically impart clarity and transparency to the CPET. The invention also relates to a process for the preparation of said thermoplastic composition of CPET.

Accordingly, the present invention provides a clear PET composition comprising
[i] PET base resin having Intrinsic Viscosity in the range of 0.95±0.02;
[ii] aliphatic dicarboxylic acid comonomers having mass 0.1 to 10% of the mass of the base resin; and
[iii] nucleating agents of particle size ranging from 20 to 10000 nm and having mass of 10 ppm to 12000 ppm, preferably 1000 to 9000 ppm of the mass of the base resin.

Typically, the aliphatic dicarboxylic acid comonomer is at least one compound selected from a group of compounds consisting of malonic, succinic, glutaric and adipic acids.

Typically, the aliphatic dicarboxylic acid comonomer incorporated in the base resin are in the range of 0.1 and 10 mole % preferably between 0.5 and 2 mole %.

Typically, the nucleating agents are selected from a group of compounds consisting of amorphous nano silicon dioxide, nano talc. alkali and alkaline earth salts of aromatic carboxylic acids like sodium benzoates, salicylates, salts of aliphatic acids like sodium acetates and nano particles of clay.

Typically, the nucleating agents are in the form of particles or a colloidal solution.

The invention also extends to a process for making a clear PET resin composition comprising the steps of thoroughly dispersing in a PET base resin having unmodified intrinsic viscosity in the range of 0.95±0.02, during or before the process of esterification of the base resin,
(i) comonomers being at least one compound selected from a group of compounds consisting of malonic, succinic, glutaric and adipic acids in the range of 0.1 and 10 mole % preferably between 0.5 and 2 mole % of the base resin,
(ii) and nucleating agents being at least one compound selected from from a group of compounds consisting of amorphous nano silicon dioxide, nano talc. alkali and alkaline earth salts of aromatic carboxylic acids like sodium benzoates, salicylates, salts of aliphatic acids like sodium acetates and nano particles of clay having particle size ranging from 20 to 10000 nm and having mass of 10 ppm to 12000 ppm, preferably 10 to 9000 ppm of the mass of the base resin.

Typically the dispersion is done in a Melt Flow Index (MFI) unit or a mixing extruder.

The comonomers and the nucleating agents can be introduced in the base resin either serially or simultaneously.

The incorporation of comonomeric units into the polymer backbone leads to an irregular chain structure and thereby inhibits regular chain packing for crystallization. The crystallization of PET copolyesters is strongly influenced by the chain microstructure regarding comonomer distribution, randomness and length of crystallizable ethylene terephthalate sequences. Thus the comonomer controls the extent of crystallization and along with the chosen nucleating agent decides the size of crystallites. The nucleating agents are of nano particle size as such or well dispersed as a sol in a medium like ethylene glycol. The chosen additives are either miscible with the polyester matrix or having closely similar refractive index to the final composition of the modified CPET resulting in transparency and clarity of the final CPET product. This modified CPET resin composition when extruded to sheets prior to thermoforming gets well oriented which is a prerequisite for the crystallization in the subsequent thermoforming process. The selected additives helps in the growth of a large number of very small spherulites which do not diffract light to a significant extent thereby giving a clear transparent crystallized CPET.

The aliphatic dicarboxylic co-monomers are selected from the acids viz. malonic, succinic, glutaric and adipic acids and are incorporated in the CPET resin between 0.1 and 10 mole % preferably between 0.5 and 2 mole %.

These nucleating agents are dispersed in the CPET polymer matrix at levels of 500 to 6000 ppm preferably between 1000 and 4000 ppm. The comonomer and the nucleating agents are thoroughly dispersed in the PET polymer, which is the unmodified 0.95±0.02 I.V. PET, by either using a Melt Flow Index (MFI) unit or a mixing extruder and the resulting modified amorphous CPET is used for simulation and evaluation of the sheet extrusion and thermoforming property and the products clarity.

The present invention is further explained in the form of following preliminary studies followed by the detailed examples of the optimized recipes. However, these should not be considered as limiting the scope of the present invention.

Preliminary Studies:

(A) Laboratory Simulation of Thermoforming

For evaluation purpose the amorphous unmodified regular CPET i.e. a PTA/MEG homopolymer without the nucleating agent and the comonomer (as a control) are used. The control amorphous homopolymer CPET is made from PTA/MEG by following the known conventional procedure of esterification of PTA and MEG. The modified CPET is also made from PTA and MEG but it additionally contained 1 mole % of adipic acid, 0.5 mole % of glutaric acid and 1000 ppm of amorphous nano silicon dioxide in combination with 2000 ppm of nano talc. The amorphous unmodified and amorphous modified CPET are extruded into strands using an MFI equipment well known in the art and is not therefore described hereinafter. These modified CPET strands are then heated in an oven between 130 and 150° C. for 8 to 12 seconds. The oven being a radiation type heater simulates the commercial process of the extruded sheet heating by ceramic heaters prior to thermoforming. The preheated strands of modified CPET are then transferred to an oil bath maintained at temperatures between 130 and 150° C. and held for 3 to 8 seconds. This conduction type oil bath heating simulates the heating during thermoforming of the commercial process. After these treatments the strands are observed for its transparency, translucency or opaqueness.

The % crystallinity of the treated strands are measured to evaluate the efficiency of the nucleating agents and their optimum usage level. Results showed that with the combined 1.5 mole % of the comonomers and 3000 ppm of the combined nucleating agent yields a transparent product with a crystallinity of ~12% at the simulation temperature of 130° C.

(B) Vacuum Forming

The modified CPET with the optimum comonomers level at 1.5% and the combined nucleating agents at 3000 ppm are processed into films by the extrusion process. The films are then subjected to vacuum forming at 170° C. for the duration ranging between 10 and 100 seconds. Transparent vacuum formed material is obtained for a treatment time of 70 seconds with a % crystallinity of ~40.

(C) Plaque Formation

The modified CPET resin with two different compositions of comonomer and nucleating agent viz. (a) 1.5 mole % comonomers and 3000 ppm nucleating agents and (b) 1.5 mole % comonomers and 5000 ppm of nucleating agents and also the unmodified normal CPET resin are used in these experiments for injection molding of the plaques. Only the plaques made with 1.5 mole % comonomers and 3000 ppm nucleating agents is transparent and clear. The modified CPET resin with 5000 ppm nucleating agent and the unmodified normal CPET resin showed haziness in the gate region which is also extending into the body.

Further optimization of the additives were carried out as described in the following examples.

Final Studies:

Example-1

2249 kg of Pure Terephthalic acid (PTA) and 624 kg of Monoethylene glycol (MEG) are fed into the esterification vessel. To this, polymerization catalyst antimony trioxide (0.99 kg), colorants cobalt acetate (0.44 kg), blue toner (0.003 kg) and red toner (0.006 kg) are added. Following this, aliphatic dicarboxylic acid comonomer, adipic acid (15 kg) and nucleating agent Nano-silica (30% wt of silica in EG solution, 5 kg) are added to the reactor. The esterification is carried out at a temperature of 240-270° C. for a period of 190 minutes. Just before transferring the esterified product to the poly reactor, nucleating agent sodium benzoate (0.07 kg) is added. The prepolymer formed is transferred to the poly reactor.

Before commencing polymerization, thermal stabilizers like Triethylphosphono acetate (TEPA) (1 kg) and Orthophosphoric acid (OPA, 0.1 kg) are added. The polymerization is conducted at a temperature of 270-285° C. and under a pressure of 5-15 mbar abs. for 190 minutes. The amorphous polymer is extruded under nitrogen pressure and collected as pellets.

Example-2

The resin composition of Example-2 is similar to Example-1 but with an increased level of nucleating agent Nano-silica, viz. 12 kg.

Example-3

1730 kg of Pure Terephthalic acid (PTA) and 680 kg of Monoethylene glycol (MEG) are fed into the esterification vessel. The molar ratio of PET/MEG is 70:30. To this polymerization catalyst antimony trioxide (0.76 kg), colorants cobalt acetate (0.42 kg), blue toner (0.003 kg) and red toner (0.004 kg), followed by adipic acid (16 kg), and nucleating agent Nano-silica (16 kg) are added to the reactor. The esterification is carried out at a temperature of 240-270° C. for 200 minutes. The prepolymer formed is transferred to the poly reactor.

Before commencing polymerization, thermal stabilizers like TEPA (0.9 kg) and OPA (0.09 kg), clear fast reheat additive (CFRH) (0.038 kg), glass beads (5 kg) are added. The polymerization is conducted at a temperature of 270-290° C. under 5-15 mbar abs. pressure for 250 minutes. After the required Intrinsic Viscosity (I.V.) is reached, 1.75 kg of nucleating agent Ethylene-Acrylic acid sodium ionomer is added to the melt. The system is again brought under vacuum and held till required I.V. is reached. The molten amorphous polymer is extruded under nitrogen pressure and collected as pellets.

Example-4

The resin composition is similar to Example-3 till the addition of thermal stabilizers, CFRH and glass beads. The polymerization is conducted at a temperature of 270-290° C. under vacuum for 220 minutes. After the required I.V. is reached, 15 kg of PolyTrimethylene Naphthalate (PTN) is added at 0.1 bar nitrogen pressure. Agitation is terminated when the desired I.V. is reached. After completing polymerization 1.75 kg of nucleating agent Ethylene-Acrylic acid sodium ionomer is added to the melt. The system is again brought under vacuum and held till the required (I.V.) is reached. The molten amorphous polymer is extruded under nitrogen pressure and collected as pellets.

TABLE I

CPET Resin composition in the Examples (additive quantities in kg)

| Ingredients | Example 1 | Example 2 | Example 3 | Example 4 |
|---|---|---|---|---|
| Batch weight | 2600 | 2600 | 2000 | 2000 |
| PTA & MEG, Molar Ratio | 70:30 | 70:30 | 70:30 | 70:30 |
| $Sb_2O_3$ | 0.99 | 0.99 | 0.76 | 0.76 |
| Sb, ppm | 320 | 320 | 320 | 320 |
| Cobalt Acetate | 0.44 | 0.44 | 0.42 | 0.42 |
| Co, ppm | 40 | 40 | 50 | 50 |
| RT/BT (Red and Blue Toners) | 0.006/0.003 | 0.006/0.003 | 0.004/0.003 | 0.004/0.003 |
| RT/BT, ppm | 2.5/2 | 2.5/2 | 2/1.5 | 2/1.5 |
| Adipic Acid | 15 | 15 | 16 | 16 |
| Adipic Acid, ppm | 5770 | 5770 | 8000 | 8000 |
| Nano-Silica | 5 | 12 | 16 | 16 |
| Nano-Silica, ppm | 1920 | 4620 | 8000 | 8000 |
| Sodium Benzoate | 0.07 | 0.07 | — | — |
| Sodium Benzoate, ppm | 30 | 30 | — | — |
| TEPA/OPA | 1/0.1 | 1/0.1 | 0.9/0.09 | 0.9/0.09 |
| TEPA/OPA, ppm as P | 450/12 | 450/12 | 450/14 | 450/14 |
| CFRH | — | — | 0.038 | 0.038 |
| CFRH, ppm | — | — | 19 | 19 |
| Glass beads | — | — | 5 | 5 |
| Glass Beads, ppm | — | — | 2500 | 2500 |
| Ethylene-Acrylic acid Na ionomer | — | — | 1.75 | 1.75 |
| Ethylene-Acrylic acid Na ionomer, ppm | — | — | 875 | 875 |
| PTN | — | — | — | 15 |
| PTN, ppm | — | — | — | 7500 |

TABLE II

Summarizes the Important Characteristics of the Amorphous CPET Polymer

| Example | IV dL/g | Carboxyl number meq/kg | DEG wt % | Haze NTU | L* CIE | a* CIE | b* CIE | $T_g$ °C. | $T_m$ °C. | $T_{ch}$ °C. |
|---|---|---|---|---|---|---|---|---|---|---|
| 1. | 0.60 | 21 | 1.45 | 10.8 | 69.1 | −0.7 | −6.1 | 77 | 250 | 144 |
| 2. | 0.60 | 18 | 1.27 | 9.8 | 69.7 | −0.9 | −5.5 | 78 | 251 | 147 |
| 3. | 0.58 | 21 | 1.47 | 55.5 | 67.0 | −2.2 | −4.0 | 78 | 248 | 127 |
| 4. | 0.58 | 21 | 1.50 | 56.9 | 65.1 | −2.2 | −3.2 | 78 | 247 | 133 |

These amorphous chips are then increased in their IV by performing a Solid State Polymerization (SSP) to get a higher IV. A higher IV of about 1.0-1.2 dL/g is maintained in order to control the crystal growth.

TABLE III

Summarizes the Important Characteristics of the SSP CPET Polymer

| Example | IV, dL/g | Carboxyl Number, meq/kg | DEG, wt % | Haze, NTU | % Crystallinity | L* CIE | a* CIE | b* CIE | $T_g$ °C. | $T_m$ °C. |
|---|---|---|---|---|---|---|---|---|---|---|
| 1. | 1.03 | 12 | 1.03 | 6.4 | — | 78.1 | −1.7 | −0.4 | 79 | 24 |
| 2. | 1.20 | 10 | 0.90 | 6.5 | — | 79.1 | −2.3 | 1.9 | 78 | 24 |
| 3. | 1.26 | 17 | — | 18.8 | 63.6 | 76.5 | −2.6 | 3.3 | 78 | 24 |
| 4. | 1.10 | 15 | — | 16.9 | 64.3 | 75.5 | — | 1.9 | 77 | 24 |

The clear CPET resin (CCPET) thus obtained is converted to films by the cast extrusion method. In this process the thoroughly dried CCPET resin is processed in an extruder and the molten polymer is taken out at the end of the extruder through a flat die. At the die exit the material is cooled by a cooling roller and then stretched in order to obtain the desired film thickness. At the end of the line the film is coiled-up. A film of 0.6-0.64 mm thickness is thus made for laboratory simulation of the thermoforming process.

These films are immersed in an oil-bath, which simulates the heating of the films prior to thermoforming, for selected time intervals, e.g. 5-30 seconds. The crystallinity values and visual appearance of these films are given in table-IV.

TABLE IV

Processing of the Film in Simulated Thermoforming

| Temperature, °C. | Time, seconds | \multicolumn{8}{c|}{Appearance & % Crystallinity} | | | | | | | |
|---|---|---|---|---|---|---|---|---|---|

| Temperature, °C. | Time, seconds | Example 1 | | Example 2 | | Example 3 | | Example 4 | |
|---|---|---|---|---|---|---|---|---|---|
| 130 | 5 | C | 2.01 | C | 2.42 | C | 3.55 | C | 3.63 |
|  | 10 | C | 2.82 | C | 2.94 | C | 4.17 | C | 4.64 |
|  | 20 | C | 7.86 | C | 8.05 | TL | 12.01 | TL | 14.42 |
|  | 30 | TL | 16.75 | O | 19.52 | O | 21.60 | O | 22.54 |
| 140 | 5 | C | 3.35 | C | 3.85 | C | 4.09 | C | 8.03 |
|  | 10 | C | 8.47 | C | 9.72 | TL | 10.15 | C | 13.41 |
|  | 20 | TL | 15.23 | TL | 16.48 | O | 20.73 | O | 22.18 |
|  | 25 | O | 19.19 | O | 20.09 | O | 22.51 | O | 24.18 |
| 150 | 5 | C | 3.99 | C | 4.57 | C | 5.03 | C | 6.22 |
|  | 10 | TL | 10.78 | TL | 12.69 | O | 18.41 | O | 19.26 |
|  | 20 | O | 18.54 | O | 20.83 | O | 25.12 | O | 27.52 |
| 160 | 3 | C | 4.68 | C | 5.64 | C | 6.42 | C | 6.60 |
|  | 5 | C | 5.75 | C | 6.82 | C | 7.82 | C | 7.93 |
|  | 8 | C | 7.04 | C | 10.35 | TL | 11.2 | C | 12.98 |
|  | 10 | C | 11.38 | TL | 12.13 | TL | 14.73 | TL | 16.87 |
|  | 15 | TL | 15.19 | TL | 17.07 | O | 21.31 | O | 23.78 |
| 170 | 5 | C | 8.27 | C | 10.69 | C | 10.89 | C | 11.04 |
|  | 8 | TL | 12.83 | TL | 13.56 | TL | 15.01 | TL | 15.72 |

C—Clear
TL—Translucent
O—Opaque

Film made from the resin of Example-4 is found to be clear with a crystallinity of 13.41% at 140° C./10 seconds, similarly at 160° C./110 seconds it is found to be translucent with a crystallinty of 16.87%. Films made from Example-1 and Example-2 differ only slightly in clarity and crystallinity. Film of Example-3 is comparable to Example-4, but the latter is better in clarity and crystallinity.

The thoroughly dried CCPET resin pellets are formed into sheets by melt extrusion in a sheet making extruder. The sheets obtained from the above process were then made into trays by thermoforming process. This process involves heating the extruded sheets in IR heaters to a temperature of about 120-160° C., so that the sheets softens and facilitates the stretching process. A sandwich IR heater is used for uniform heating of the sheet. This pre heated sheet is then passed over the thermoforming mold where a temperature of 140-180° C. is maintained. The thermoformed article is kept in the mold for a desired residence time (say 4 seconds) to increase the crystallization. The properties of these trays are given in the following table-V.

TABLE V

Properties of the Thermoformed Trays

| Properties | Unit | Example 1 | Example 2 | Example 3 | Example 4 |
|---|---|---|---|---|---|
| Weight | g | 17.7 | 17.7 | 17.7 | 17.7 |
| Bottom thickness | Mm | 0.27 | 0.29 | 0.27 | 0.29 |
| Wall thickness | Mm | 0.30 | 0.33 | 0.27 | 0.26 |
| Rim thickness | Mm | 0.74 | 0.73 | 0.41 | 0.41 |
| IV | dL/g | 0.880 | 0.881 | 0.983 | 0.958 |
| Haze | % | 10.37 | 11.7 | 11.1 | 11.3 |
| Appearance |  | C | C | C | C |
| $T_g$* | °C. | 78 | 78 | 80 | 79 |
| $T_{ch}$* | °C. | 141 | 141 | 123 | 123 |
| $T_m$* | °C. | 246 | 243 | 244 | 243 |
| Rim crystallinity | % | 11.22 | 11.22 | 10 | 20.65 |
| Wall crystallinity | % | 12.35 | 12.08 | 14.22 | 24.52 |
| Bottom crystallinity | % | 12.69 | 12.52 | 16.2 | 23.98 |
| Overall Crystallinity* | % | 13.22 | 12.89 | 19.82 | 24.52 |
| Crystallinity | % | 12.59 | 12.52 | 16.2 | 22.09 |

*Measurements by DSC thermal analysis. Other crystallinities are by Density gradient.

As mentioned before the CCPET resin have to be dried properly before making it to sheets. The moisture content of the dried resin should be less than 50 ppm. If the moisture content is more, then there will be an IV drop due to hydrolytic degradation while extruding, over and above the I.V. drop observed due to the thermal degradation which occurs while extruding. This additional IV drop with the resultant decrease in molecular weight may lead to sagging of sheets. A sagged sheet cannot be satisfactorily processed to thermoformed trays.

The resin of type 1 and 2 formed trays with lower crystallinity. The haze values of all trays were found to be acceptable. The resin of type 3 and 4 formed trays with crystallinty above 18% and haze around 11%, and the trays have good clarity and stiffness.

Vacuum Forming:

Trays are made by vacuum forming process from the resin. The vacuum forming was carried out in 4 seconds. The percentage crystallinity of the vacuum formed trays at 200° C. and 190° C. temperature are measured. The trays are cut into small strips and immersed in oil bath maintained at desired temperature and quenched for different time intervals, say 3, 5, 10 seconds. The crystallinity and appearance of the trays are compared in the following table. It is observed that the trays become translucent from clear after immersion in hot oil bath.

TABLE VI

Crystallinity of Vacuum Formed Trays

| Temperature, °C. | Time, seconds | Appearance & % Crystallinity | | | | | | | |
|---|---|---|---|---|---|---|---|---|---|
| | | Example 1 | | Example 2 | | Example 3 | | Example 4 | |
| As such | | 12.59 | | 12.52 | | 16.2 | | 22.09 | |
| 200 | 3 | O | 20.00 | O | 14.62 | TL | 24.96 | TL | 27.64 |
| | 5 | O | 20.17 | O | 14.87 | TL | 25.61 | TL | 28.45 |
| | 10 | O | 22.10 | O | 17.37 | TL | 28.13 | TL | 28.72 |
| 190 | 3 | O | 15.9 | O | 14.62 | TL | 24.51 | TL | 27.82 |
| | 5 | O | 17.19 | O | 15.13 | TL | 25.67 | TL | 28.24 |
| | 10 | O | 20.17 | O | 18.94 | TL | 26.25 | TL | 28.38 |

Plaque Forming:

Plaques were made by injection molding for all the four type of resin. The resin is heated above its melting point and forced into a cavity under sufficient pressure, to fill the cavity. The mold is cooled and then removed. The temperature maintained at different zones were given in the following table.

TABLE VII

Zonal Temperature in Plaque Forming

| Zone | Temperature, °C. |
|---|---|
| 1 (nozzle) | 260 |
| 2 | 245 |
| 3 | 230 |
| 4 | 220 |
| 5 (hopper) | 190 |

The plaques formed from resin 1, 3 and 4 are clear whereas the plaque from resin 2 appeared to be haze.

The dual-ovenable trays are kept in an oven (approx. 220° C.) for 15-30 minutes. The results are given in the following table with observations before and after keeping in the oven.

TABLE VIII

Characteristics of Dual-Ovenable Tray

| Properties | | Example 1 | Example 2 | Example 3 | Example 4 |
|---|---|---|---|---|---|
| Intrinsic Viscosity, dL/g | | 0.880 | 0.881 | 0.983 | 0.958 |
| % Crystallinity | Before | 13.22 | 11.89 | 19.82 | 24.52 |
| Shape retention | After | No change | Deforms at walls | No change | No change |
| Appearance | After | Opaque | Opaque | Opaque | Opaque |

Though no deformation of the trays are seen after keeping in the oven all the trays loose their clarity and become opaque after the heat treatment.

ADVANTAGES OF THE PRESENT INVENTION

1. The CPET resin of the present invention exhibits improved molding properties, high dimensional stability with good impact resistance and is particularly useful in applications for food grade dual-ovenable trays.
2. The containers made of clear transparent CPET resin of the present invention are fully transparent and allow the user to clearly view the contents inside.
3. The covers of the container of the present invention are made of CPET and therefore it need not be removed before it is placed in micro wave/or the normal oven.

The invention claimed is:

1. A clear PET composition comprising
   [i] PET base resin having Intrinsic Viscosity in the range of 0.95±0.02;
   [ii] aliphatic dicarboxylic acid co-monomers having mass 0.01 to 10% of the mass of the base resin; and
   [iii] nucleating agents of particle size ranging from 20 to 10000 nm and having mass of 10 ppm to 12000 ppm of the mass of the base resin wherein the nucleating agents are in the form of a colloidal solution.

2. A clear PET composition as claimed in claim 1, in which the aliphatic dicarboxylic acid comonomer is at least one compound selected from the group consisting of compounds of malonic, succinic, glutaric and adipic acids.

3. A clear PET composition as claimed in claim 1, in which the aliphatic dicarboxylic acid comonomer incorporated in the base resin is in the range of 0.1 and 10 mole %.

4. A clear PET composition as claimed in claim 1, in which the nucleating agents are selected from the group consisting of amorphous nano silicon dioxide, nano talc, alkali and alkaline earth metal salts of, aromatic carboxylic acids, salts of aliphatic acids and nano particles of clay.

5. A clear PET composition as claimed in claim 1, in which the nucleating agents are in the form of particles.

6. A process for making a clear PET resin composition comprising thoroughly dispersing in a PET base resin, having unmodified intrinsic viscosity in the range of 0.95±0.02, during or before the process of esterification of the base resin,
   (i) comonomers being at least one compound selected from the group consisting of compounds consisting of malonic, succinic, glutaric and adipic acids in the range of 0.1 and 10 mole % of the base resin,
   (ii) and nucleating agents being at least one compound selected from the group consisting of sodium benzoate, sodium salicylate and sodium acetate having a particle size ranging from 20 to 10000 nm and having mass of 10 ppm to 12000 ppm, of the mass of the base resin.

7. A process for making a clear PET resin composition as claimed in claim 6, in which the dispersion is done in a Melt Flow Index (MET) unit or a mixing extruder.

8. A process for making a clear PET resin composition as claimed in claim 6, in which the comonomers and the nucleating agents are introduced in the base resin either serially or simultaneously.

9. A clear PET composition of claim 1 wherein the nucleating agents have a particle size range of 10 to 9,000 ppm of the mass of the base resin.

10. A clear PET composition of claim 3 wherein the aliphatic dicarboxylic acid and comonomer is 0.5 to 2 mole %.

11. A clear PET composition of claim 4 wherein the nucleating agent is selected from the group consisting of alkali metal and alkaline earth metal salts of benzoic acid, salicyclic acid and sodium acetate.

* * * * *